United States Patent [19]
Peeters et al.

[11] Patent Number: 6,032,536
[45] Date of Patent: Mar. 7, 2000

[54] PRESSURE SENSOR AND METHOD FOR DETECTING PRESSURE

[75] Inventors: Eric Peeters, Fremont; David K. Biegelsen, Portola Valley; Warren Jackson, San Francisco, all of Calif.

[73] Assignee: Xerox Corporation, Stamford, Conn.

[21] Appl. No.: 09/161,534

[22] Filed: Sep. 28, 1998

[51] Int. Cl.[7] ....................................................... G01L 9/02
[52] U.S. Cl. ................................ 73/725; 399/371; 399/16
[58] Field of Search .............................. 73/725, 862.046, 73/862.583; 399/371, 16

[56] References Cited

U.S. PATENT DOCUMENTS 4,479,392  10/1984  Froeb et al. .......................... 73/862.68

OTHER PUBLICATIONS

C. F. Malacaria, *A Thin, Flexible, Matrix–Based Pressure Sensor*, Sensors, pp. 102–104, Sep. 1998.
C. Haverty et al., *Enhancing Computer Game Joysticks with Smart Force Transducers*, Sensors, pp. 92–95, Sep. 1998.

*Primary Examiner*—Joseph L. Felber
*Attorney, Agent, or Firm*—Oliff & Berridge, PLC

[57] ABSTRACT

A pressure sensor is provided which can detect the presence, absence or magnitude of pressure. The pressure sensor includes a sensor membrane and a sensor device. The sensor membrane is flexible and may be constructed of a conductive material or may include a flexible film attached to a conductive film. The sensor device includes an electrode substrate having an electrode surface and a set of electrodes disposed on the electrode surface. As pressure is applied to the sensor membrane, the sensor membrane distends or deforms towards the electrode set positioned on the electrode surface. As sufficient pressure is applied, the sensor membrane will make both electrical and mechanical contact with at least two of the electrodes. Since the sensor membrane is conductive, the contacted electrodes will be in electrical connection with each other. As pressure is increased, additional electrodes will be contacted and placed in electrical contact with each other. As a result, the presence, absence or magnitude of pressure exerted on the sensor membrane may be determined. The pressure sensor may be utilized in a variety of environments to sense either fluid pressure or physical contact pressure.

27 Claims, 6 Drawing Sheets

PRESSURE SENSOR AND METHOD FOR DETECTING PRESSURE

BACKGROUND OF THE INVENTION

1. Field of Invention

This invention relates to a pressure sensor that detects the presence, the absence, or the magnitude of pressure or force. More specifically, this invention relates to a pressure sensor that senses pressure or force using thin film technology.

2. Description of Related Art

Pressure sensors are typically used to detect pressure variations in a wide variety of environments, such as pressure in working devices and pressure in living environments, for example. Also, pressure sensors are used to detect pressure variations of a wide variety of mediums. For example, the pressure exerted by a fluid may be sensed. The fluid may be air or water, for example. One illustrative example of an apparatus that senses fluid pressure is a conventional air pressure gauge. Such conventional air pressure gauges commonly include a movable member that moves in proportion to an amount of air pressure exerted by an air pressure source. Also, conventional air pressure gauges commonly include a measuring or indicating member. The measuring or indicating member provides an indication of the amount of movement of the movable member. As a result, the measuring or indicating member provides an indication of the amount of pressure exerted on the movable member.

An additional illustrative example of an apparatus that senses a mechanical contact pressure is a conventional touch keyboard. Such a conventional touch keyboard is used in various devices to input information including a computer keyboard and a touch tone phone, for example. Such devices include numerous keys which must sense the application of a physical pressure. When a user exerts a physical pressure on one of the keys, an indication is generated that the user has selected that specific key.

SUMMARY OF THE INVENTION

However, these and other conventional devices for sensing either fluid or physical pressure are subject to various disadvantages. One disadvantage is the complex arrangement of parts in some conventional pressure sensors. Another disadvantage of conventional pressure sensors is that the parts that form conventional pressure sensors are often moving parts and, as a result, prone to breakage.

This invention provides a pressure sensor for sensing the presence, the absence, or the magnitude of pressure that is versatile and widely adaptable to a variety of situations and environments in which the determination of pressure exerted by a fluid or by physical contact is desirable.

This invention provides a pressure sensor that can effectively sense a variety of types of fluid pressure and contact pressure or of spatial pressure/force distributions.

This invention provides a pressure sensor that is compact, is batch-fabricatable, and can be positioned in a variety of sections or areas within a device in which it is desirable to determine the presence, the absence, or the magnitude of an applied pressure.

In accordance with this invention, in one preferred embodiment, a pressure sensor includes a sensor membrane which is integrated with a sensor device. The sensor membrane is conductive. The sensor membrane is formed of a single unitary conductive material. Alternatively, the sensor membrane may be formed of a flexible film and a conductive film. The flexible film is attached to the conductive film, for example, by a lamination process or the conductive film may be vacuum deposited onto the flexible film. The sensor membrane is constructed of flexible, bendable, or resilient material to deform or bend in response to a pressure exerted on the sensor membrane. When no pressure is exerted on the sensor membrane, the sensor membrane will be in an undeformed position, hereinafter referred to as a rest position.

The pressure sensor in accordance with this invention also includes a sensor device arranged adjacent to the sensor membrane. Each sensor device includes a set of electrodes, i.e., an electrode set, and an electrode substrate having an electrode surface. The electrode set is positioned on the electrode substrate, and specifically on the electrode surface of the electrode substrate. The electrode set includes a plurality of electrodes. The plurality of electrodes may be arranged in a variety of geometrical arrangements. One preferred arrangement includes a center electrode surrounded by a plurality of annular electrodes. The electrode set and the electrode surface are disposed to be spaced from at least a portion of the sensor membrane when the sensor membrane is in the rest position. As a result, a sensing space is formed between the sensor membrane and the electrode surface.

When no pressure is exerted on the sensor membrane, the sensor membrane is positioned in the rest position. However, when pressure is applied to the sensor membrane, the sensor membrane yields to the pressure and deforms or distends towards the electrode surface and the electrodes positioned on the electrode surface of the electrode substrate. As a certain threshold deformation is attained as a result of a threshold pressure, the sensor membrane will contact one of the plurality of electrodes. As additional pressure is applied past the threshold pressure, the sensor membrane will contact another of the plurality of electrodes. Since the sensor membrane is conductive, the sensor membrane provides an electrical connection between the two electrodes contacted by the sensor membrane. Based on this electrical contact, the degree of deformation of the sensor membrane may be determined. The degree of deformation of the sensor membrane is dependent on the pressure applied to the sensor membrane. As a result, the pressure applied to the sensor membrane may be determined based on the electrical contact of the sensor membrane with the two electrodes. As additional pressure is applied to the sensor membrane, the sensor membrane deforms so as to contact additional electrodes of the plurality of electrodes. Accordingly, the pressure sensor in accordance with this invention senses this additional pressure and outputs an indication of the magnitude of the pressure exerted on the pressure sensor. It should be noted that with some electrode geometries, one may also be able to detect the location of contact areas and therefore the spatial distribution of pressure or force.

The pressure sensor of this invention has a wide variety of applications in a wide variety of environments. Illustratively, one particular application of the pressure sensor in accordance with the invention is to perform as a sensor to detect the presence, the absence, or the position of an object. Specifically, the pressure sensor may be used in conjunction with a fluid flow source to detect the position, presence or absence of an object. The pressure sensor may be opposed to the fluid flow source and positioned adjacent to an object passage through which an object passes or adjacent to an area or section of a device in which an object is positioned. As the object moves through the object passage, the object moves between the fluid flow source and the pressure sensor.

As a result, the object will obstruct or impede the fluid flow source impacting on the pressure sensor to vary the pressure exerted on the pressure sensor. The pressure sensor outputs a signal indicative of this variance in the applied pressure.

One illustrative example of an apparatus in which a pressure sensor may be used, in accordance with the invention, is to detect an object's position in a photocopy device. For example, the pressure sensor may be used to detect the position of a sheet of paper. Typically, in a photocopy device, multiple paper sheets are stored in a paper storage bin. Upon initiation of a copying process, each sheet is transported from the paper storage bin through various paths in the photocopy device. For example, the sheet is transported via a specified path to an area in which an image is reproduced on the paper, i.e., an image forming engine. Thereafter, the sheet is transported via additional paths to a recovery bin from which the sheet can be retrieved.

It is integral to the operation of the photocopier that the position of each paper sheet be monitored as it passes through the various paths. Accordingly, the pressure sensor of the invention may be positioned in one of the paths of the photocopy device in conjunction with a fluid flow source. As the paper sheet moves through the path of the photocopy device, the paper sheet will, at a certain point, move between the fluid flow source and the pressure sensor. As a result, the paper sheet will obstruct or impede the fluid flow impacting on the pressure sensor so as to vary the pressure on the pressure sensor. Accordingly, the pressure sensor outputs a signal indicative of the presence, arrival, or departure of the paper sheet.

Specifically, the pressure sensor used to detect the presence, arrival, or departure of the paper sheet in a photocopy device can include a sensor membrane and a sensor device in accordance with this invention. The sensor device comprises an electrode set disposed on an electrode substrate. When a sheet of paper is not positioned between the fluid flow source and the pressure sensor, for example, because the paper sheet has not yet arrived, the unimpeded fluid flow passing from the fluid flow source impacts on and distends the sensor membrane with a certain force. Due to the deformation of the sensor membrane, the sensor membrane will make both mechanical and electrical contact with the electrodes positioned on the electrode substrate. However, when the sheet of paper arrives at a position between the fluid flow source and the pressure sensor, the fluid flow will decrease. Accordingly, the deformation of the sensor membrane will move towards a rest position away from the electrode substrate. As the position of the sensor membrane changes, mechanical and electrical contact between the sensor membrane and the electrodes positioned on the electrode substrate will vary. As a result, the presence, arrival or departure of the paper sheet in the path of a photocopy device may be determined.

Accordingly, this invention provides a pressure sensor and method for sensing pressure that is versatile and widely adaptable to a variety of situations in which it is desirable to detect pressure, for example, to detect the position, presence, or absence of an object in a section or area of a device. The invention further provides a pressure sensor that is compact, batch-fabricatable and can be positioned in a variety of sections or areas within a device in which it is necessary to determine the pressure.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The pressure sensor in accordance with this invention may be positioned in any device in which it is necessary or desirable to detect the presence, the absence, the magnitude or profile of pressure. Further, the pressure sensor according to this invention can perform in any device in which it is necessary or desirable to measure a pressure and in which the pressure may be exerted to deform a sensor membrane of the pressure sensor. For example, the pressure sensor may be used in any device in which a fluid flow may be directed against a sensor membrane, or a physical pressure may be applied to the sensor membrane. For example, the pressure sensor of the invention can be used as an object sensor in conjunction with a fluid flow source to variably impact on and deform the sensor membrane depending on the position, presence or absence of an object. Also, the pressure sensor in accordance with the invention may be utilized in fluid storage devices, such as air compressors, or fluid transport lines, such as water supply lines. Alternatively, the pressure sensor may detect contact pressure generated by physical contact, such as a fingertip depressing a keyboard or a touch screen. As outlined above, the pressure sensor can be used anywhere the presence or magnitude of pressure needs to be determined, so long as the pressure sensor can be exposed to the pressure to be determined.

As noted above, one particular application of the pressure sensor of the invention is to be used in conjunction with fluid pressure. It should be appreciated that any known or later developed fluid can be used in conjunction with the pressure sensor in accordance with the invention. The only limitation on the fluid is that the fluid cannot damage or pollute either the pressure sensor or any of the surrounding elements of the device in which the pressure sensor is located or that device's environment.

It should further be appreciated that the pressure sensor according to this invention can be used as an object sensor to sense the position or presence/absence of any type of object that can be transported through the object passage described below to obstruct, block or occlude the fluid flow across the object passage. Thus, so long as the fluid flow is sufficiently altered by the object traveling through the object passage such that the altered fluid flow can be sensed by the pressure sensor used, the position and/or the presence or absence of any object can be sensed by the pressure sensor and pressure sensing method according to this invention.

In the following exemplary description of some embodiments of the pressure sensor and pressure sensing method according to this invention used to determine the position, presence or absence of an object, the fluid is air. However, as set forth above, it should be appreciated that the sensor and sensing method according to this invention are not limited to air. Similarly, in the following exemplary description of some embodiments of the pressure sensor and sensing method according to this invention, the object is a paper sheet and the pressure sensor is positioned within an image forming device, such as a printer, a photocopier, a facsimile or the like. However, as set forth above, it should be appreciated that the pressure sensor and sensing method of this invention are not limited to sensing paper or being positioned in or used with an image forming device.

Thus, the fluid used in conjunction with the pressure sensor of the invention could be another gas, such as any gaseous-state element, like oxygen, nitrogen, helium, hydrogen, neon, argon or the like, any gaseous-state molecular compound or mixture, like carbon dioxide, steam, methane or other gaseous hydrocarbon or hydrocarbon vapors, an organic gas, such as ether, or the like. Similarly, the fluid could be a liquid, such as any liquid-state element, like mercury, any liquid-state molecule, compound or mixture, like water, liquid hydrocarbon, such as mineral or vegetable oil, organic liquid, such as acetone or formaldehyde, fluids used in fabrication of integrated circuits, such as buffered oxide etch or KOH or the like. Those skilled in the art will appreciate that the appropriate fluid to be used in a particular embodiment of the pressure sensor and sensing method according to this invention will depend on the pressure sensing environment, fluid sensing device, object to be sensed and the like.

Additionally, the pressure sensor in accordance with this invention may be used in conjunction with or in any of the devices disclosed in co-pending U.S. patent applications Ser. No. 09/161,532 (Attorney Docket No. 100130) and Ser. No. 09/161,533 (Attorney Docket No. 100132) filed herewith and incorporated by reference in their entirety.

As described above, one particular application of the pressure sensor of the invention is to sense objects. Some examples of objects to be sensed include paper and other recording media, sheet-like materials, such as paper webs, sheet metals, ribbons, and the like, and even screen-like materials and other objects having holes or passages through which the fluid could flow, if the material or object is nonetheless able to sufficiently disturb, reduce or block the fluid flow such that the presence or absence, the position, and/or even the shape and size of the material or object is detectable.

Thus, the pressure sensor and sensing method according to this invention are usable with a digital or analog photocopier, a printer, a facsimile machine, a document handler, a collator, an offset printer, a newspaper printer, a paper making machine, a sheet metal rolling machine, a sheet metal annealing machine, a sheet metal cooling device, an extruder, a conveyor system, silicon wafer handling either in air or in dionized water or a materials transport system, as well as with numerous other devices.

Figure 1:
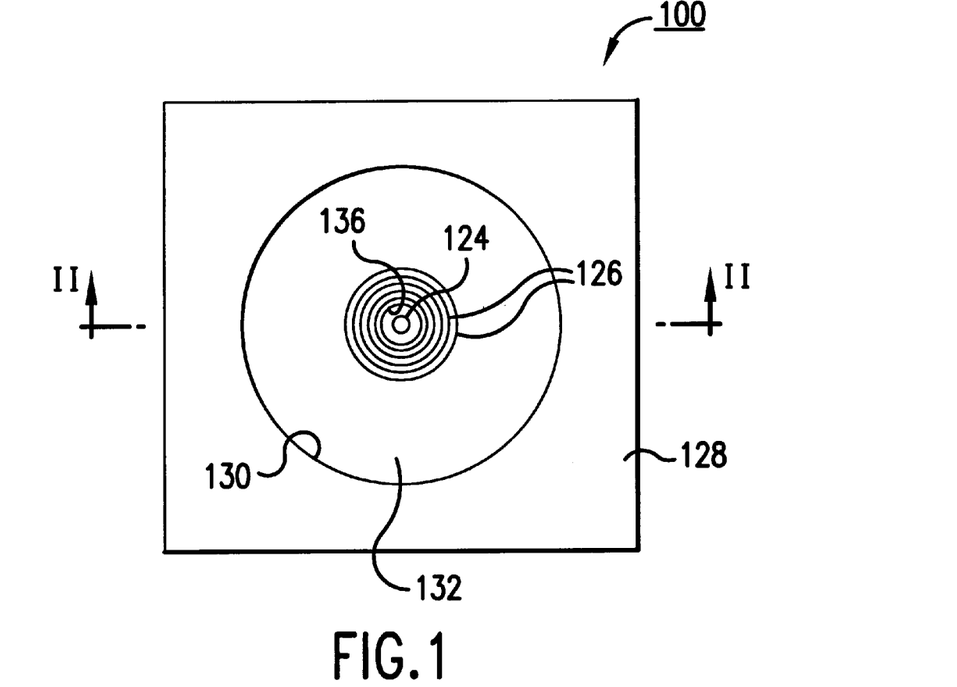
FIG. 1 is a top plan view of a pressure sensor in accordance with an embodiment of the invention.
Figure 2:
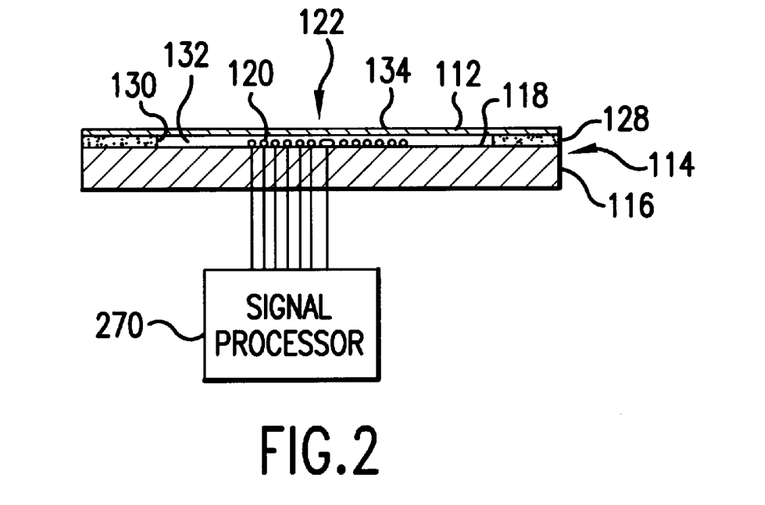
FIG. 2 is a side cross-sectional view of the pressure sensor of FIG. 1 along the line II—II in accordance with an embodiment of the invention.

FIGS. 1 and 2 show a pressure sensor 100 in accordance with a preferred embodiment of this invention. As shown in FIGS. 1 and 2, the pressure sensor 100 includes a sensor membrane 112 and a sensor device 114. The sensor membrane 112 is spaced from the sensor device 114 and variably contacts and interacts with the sensor device 114 as discussed in detail below.

The sensor membrane 112 in accordance with one embodiment of this invention can be formed of a flexible conductive material or can be formed of a flexible film and a conductive film attached to the flexible film. As shown in FIG. 2, the sensor membrane 112 is disposed along a flat horizontal plane when the sensor membrane 112 is in an undeformed rest position. The sensor membrane 112 is positioned in an undeformed rest position when no pressure is applied to the sensor membrane 112.

The sensor device 114 includes an electrode substrate 116 having an electrode surface 118. The sensor device 114 further includes a set 122 of electrodes 120. The electrode set 122 is positioned on the electrode substrate 116, and specifically on the electrode surface 118 of the electrode substrate 116. The electrode set 122 includes a plurality of the electrodes 120. Each electrode 120 is positioned on the electrode surface 118. In the embodiment shown in FIGS. 1 and 2, the electrodes 120 of the electrode set 122 include a center electrode 124 and a plurality of outer electrodes 126. The center electrode 124 is circular, as shown in FIGS. 1 and 2. The outer electrodes 126 surround the center electrode 124 and are preferably include a number of finely spaced annular electrodes 120.

However, it should be recognized that a wide variety of shapes and geometrical arrangements of the electrodes 120 may be used to form the electrode set 122 in accordance with this invention. For example, individual electrodes 120 of the electrode set 122 can be of various shapes, including circular, annular, elliptical, and/or square. Further, the individual electrodes 120 can be arranged in a wide variety of arrangements including the circular electrode 124 surrounded by circular annular electrodes 126 as shown in FIG. 1, a plurality of straight linear electrodes arranged side by side and positioned parallel to one another, or a plurality of square electrodes positioned in a line.

In the undeformed rest condition, the sensor membrane 112 is spaced from and lies parallel to the electrode surface 118 of the electrode substrate 116 in the embodiment of the invention shown in FIGS. 1 and 2. A spacer layer 128 is provided to space the sensor membrane 112 from the electrode substrate 116 and the electrode set 122 positioned on the electrode surface 118 of the electrode substrate 116. Both the spacer layer 128 and the electrodes 120 are attached, for example, by a lamination process onto the electrode surface 118 of the electrode substrate 116. Also, the sensor membrane 112 may be laminated onto the spacer layer 128. Alternately, the electrodes 120, the spacer layer 128 and/or the sensor membrane 112 can be formed by standard semiconductor processing techniques, including photolithography and the like.

The spacer layer 128 is annular. A circular area 130 is defined in the spacer layer 128. A sensing space 132 is defined by the electrode surface 118, the spacer layer 128 and the sensor membrane 112. A sensing area 134 is defined on the sensor membrane 112 where the sensor membrane 112 extends over the sensing space 132. The electrodes 120 of the electrode set 122 are centrally positioned in the sensing space 132, as shown in FIGS. 1 and 2. Specifically, the circular center electrode 124, as shown in FIG. 1, is positioned centrally within the sensing space 132. Both the center electrode 124 and the annular outer electrodes 126 are positioned on the electrode surface 118 of the electrode substrate 116.

When pressure, such as fluid pressure, for example, is applied to the sensing area 134 of the sensor membrane 112, the sensor membrane 112 deforms and bends toward the electrode substrate 116 and the electrodes of the electrode set 122 positioned on the surface of the electrode substrate 116. As a result, the sensor membrane 112, which is entirely conductive, or alternatively includes a conductive film, will make both mechanical and electrical contact with one or more of the electrodes 120 of the electrode set 122.

The sensor membrane 112 may initially make contact with either the center electrode 124 or one of the outer electrodes 126 depending on the point of application of the pressure on the sensing area 134. Accordingly, it should be appreciated that operation of the pressure sensor 100 may take place when the sensor membrane 112 does not contact the center electrode 124 first and the invention is not limited to initial contact of the sensor membrane 112 solely against the center electrode 124. Rather, the sensor membrane 112 may contact one of the outer electrodes 126 first. The electrode upon which the sensor membrane 112 makes initial contact will depend on the specific operating circumstances.

As described above, the sensor membrane 112 includes a resilient deformable material. As a result, when pressure is applied to the sensing area 134 of the sensor membrane 112, the sensor membrane 112 deforms into the sensing space 132 and towards the electrode substrate 116 and the electrodes 120 of the electrode set 122 disposed on the electrode surface 118. Depending on the specific properties of the pressure sensor 100, a predetermined threshold pressure ($P_o$) is necessary for the sensor membrane 112 to initially contact one of the electrodes 120, such as, for example, the center electrode 124. The pressure exerted on the sensing area 134 may be less than the predetermined threshold pressure ($P_o$). As a result, the sensor membrane 112 will not contact any of the electrodes 120 of the electrode set 122 and no pressure will be sensed.

However, the pressure exerted on the sensor membrane 112 may be sufficient to equal or exceed the predetermined threshold pressure ($P_o$). If the pressure exerted on the sensor membrane 112 does exceed the predetermined threshold pressure ($P_o$), and progressively increases in excess of the predetermined threshold pressure ($P_o$), the sensor membrane 112 will consecutively contact additional ones of the electrodes 120 of the electrode set 122. For example, when the predetermined threshold pressure ($P_o$) is attained, the sensor membrane 112 first contacts the center electrode 124. As the applied pressure increases in excess of the predetermined threshold pressure ($P_o$), the sensor membrane 112 contacts, for example, the annular outer electrode 136 positioned immediately adjacent to the center electrode 124. As the applied pressure further increases, the sensor membrane 112 will progressively contact additional ones of the annular outer electrodes 126 spaced further from the center electrode 124. As a result, since the sensor membrane 112 is conductive, the sensor membrane 112 will provide electrical contact between the center electrode 124 and consecutive annular outer electrodes 126 surrounding the center electrode 124. In other words, consecutive ones of the annular electrodes 120 will be shorted to the center electrode 124, as well as shorted to each other as the applied pressure increases. The number of annular electrodes 120 that are shorted to the center electrode 124 provides a measure of the deformation of the sensor membrane 112, and in turn, a measure of the pressure applied to the sensor membrane 112.

The sensor membrane 112 is positioned over the electrode set 122 and must be constructed to allow deformation of the sensor membrane 112 to variably contact the electrodes 120 of the electrode set 122. Accordingly, the sensor membrane 112 may be constructed of any compliant elastic film that will elastically deform in response to pressure exerted on the sensor membrane 112. For example, the sensor membrane 112 may be a compliant elastic film, such as silicone or a polymer sheet. However, it should be recognized that the sensor membrane 112 does not have to be elastic or rubbery, but that alternatively, a sensor membrane that can bend, i.e., without stretching, is sufficient. This is especially true if the gap, i.e. the spacer gap, between the sensor membrane and the electrodes is sufficiently narrow.

In the embodiment of the pressure sensor 100 shown in FIGS. 1 and 2, the electrode set 122 includes the center electrode 124 surrounded by the annular outer electrodes 126. Each electrode 120 is individually connected to a signal processor 270, as shown in FIG. 2. The signal processor 270 determines which electrodes 120 are electrically contacted by the sensor membrane 112 and outputs an output signal based on which electrodes 120 are contacted. The output signal may be in the form of a digital signal to reflect the counted number of shorted annular electrodes 120. Further, the output signal may be an analog staircase signal to reflect the counted number of shorted annular electrodes 120.

The dynamic range of operation of the pressure sensor 100 in accordance with this invention depends upon the pressure required to contact the first electrode, for example the center electrode 124, versus the pressure required to contact all the electrodes 120, for example the outermost annular electrode 126. The pressure resolution, i.e., the sensitivity of the pressure sensor 100, within this dynamic range depends largely on the number of, and particular geometrical arrangement of the electrodes 120 relative to each other, as well as the particular shape of the electrodes 120 themselves. That is, the pressure resolution depends on the number and pattern of the electrodes 120. Further, the resolution depends on the pattern of the electrodes 120 relative to the dimensions of the sensing space 132. The resolution also depends on the variation of deformability of the membrane with pressure. As described above, the signal processor 270 can output an analog staircase output signal. The shape of the staircase may be a linear stair, a parabolic stair, or some other shape. The shape of the staircase may be selected by choosing a function, based on the pattern of the electrodes 120, to most effectively and accurately reflect the contact condition of the sensor membrane 112 upon the electrodes 120.

Figure 3:
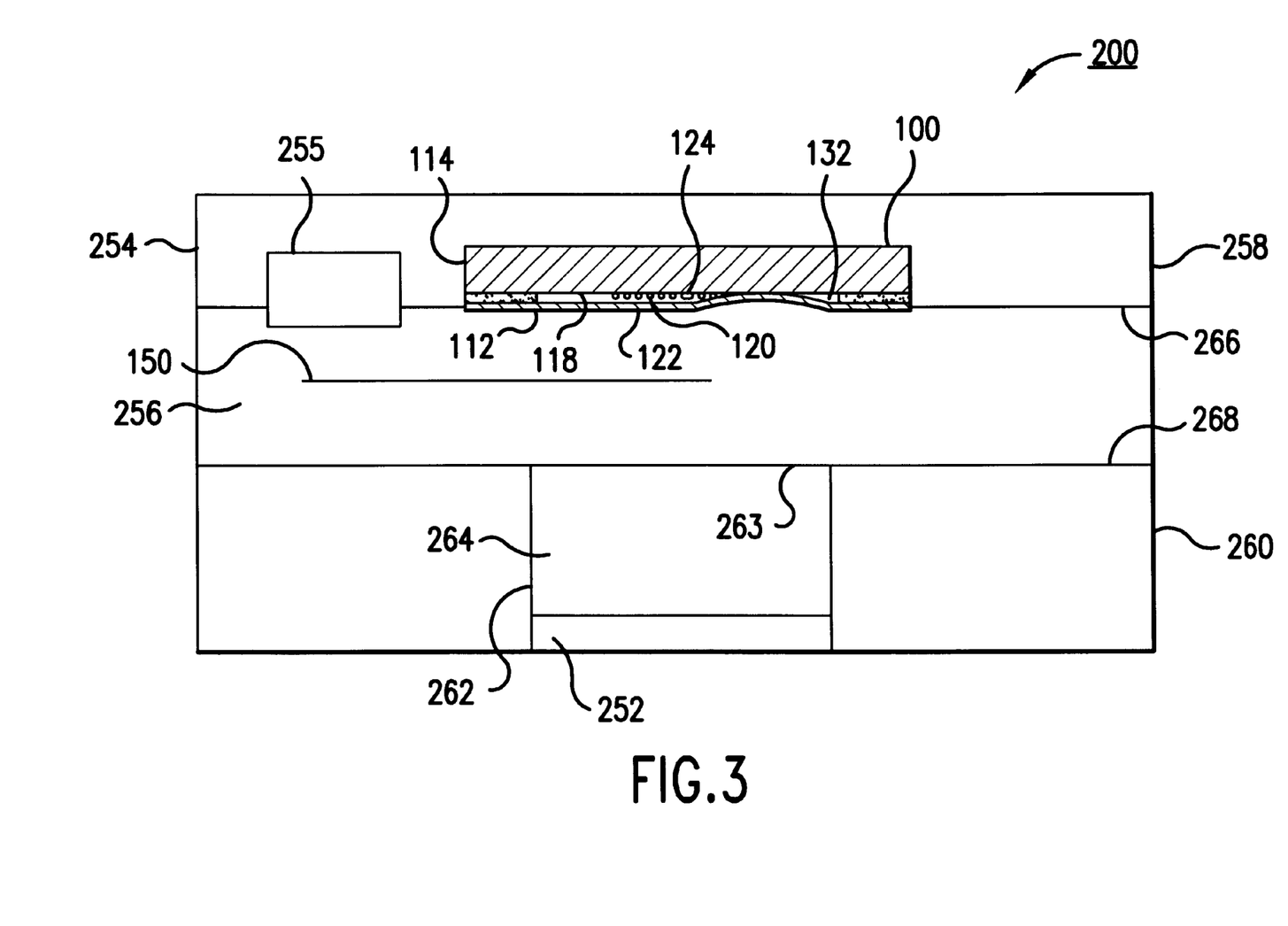
FIG. 3 is a side cross-sectional view of the pressure sensor shown in FIGS. 1 and 2 used as an object sensor in accordance with an embodiment of the invention.

Illustratively, the pressure sensor 100 of this invention may be used in an object sensor arrangement 200 in accordance with one aspect of the invention, as shown in FIG. 3. FIG. 3 shows the object sensor arrangement 200 in accordance with an embodiment of this invention. The object sensor arrangement 200 includes at least one pressure sensor 100 according to this invention integrated with a fluid flow source 252. As described above, the pressure sensor 100 used in the object sensor arrangement 200 includes a sensor device 114 and a sensor membrane 112. The fluid flow source 252 is, for example, an air jet, such as a fan.

The object sensor arrangement 200 may be positioned in any device in which it is necessary or desirable to detect the presence, absence or position of an object. Illustratively, the object sensor arrangement 200 in accordance with this invention may be utilized in coffee machines or in conjunction with a robotic arm to determine a position of an object. Alternatively, the object sensor arrangement 200 may be positioned in an area of a photocopy device in which it is necessary or desirable to sense the position of an object, such as a sheet of paper. Such an area of a photocopier may be adjacent to an image forming engine, a registration module or an output tray, for example.

Illustratively, FIG. 3 shows an image forming engine 255. The object passage 256 can be positioned adjacent to the image forming engine 255 to monitor the position of a paper sheet 150. The image forming engine 255 may be any known arrangement, such as a photosensitive drum or an ink cartridge arrangement, capable of reproducing an image on the paper sheet 150 as the paper sheet 150 passes by the image forming engine 255. However, it should be appreciated that, as outlined above, the object sensor arrangement 200 can be used anywhere a presence or absence of an object, or a position of the object, needs to be determined, so long as the object sensor arrangement 200 can be provided with the required fluid flow.

The object sensor arrangement 200 further includes a sensor housing 254 having an object passage 256 through which the object 150 to be sensed can be transported. The sensor housing 254 includes a sensor portion 258 and a jet portion 260. The object sensor arrangement 200 further includes a fluid passage 262 through which the flow of air passes. The object passage 256 is connected to and communicates with the fluid passage 262. The fluid passage 262 includes an inflow passage 264, as shown in FIG. 3. The object passage 256 has a fluid outflow surface 266 and a fluid inflow surface 268. The fluid outflow surface 266 defines one surface of the object passage 256 and the fluid inflow surface 268 defines an opposite surface of the object passage 256.

Fluid flows from the fluid flow source from the inflow passage 264 into the object passage 256 through the fluid inflow surface 268. Fluid flows across the object passage 256 and impacts or impinges upon the fluid outflow surface 266. The sensor membrane 112 of the pressure sensor 100 is flush with the fluid outflow surface 266 and forms a portion of the fluid outflow surface 266. The dimensions of the object passage 256 may be any dimensions suitable to allow the object 150 to pass through the object passage 256. For example, the object passage 256 may be dimensioned to accommodate a sheet of paper.

The perimeters of the fluid passage 262 may be of any suitable shape, such as square or circular. However, a circular shape may reduce the number of vortexes in the fluid flow occurring in the fluid passage 262, relative to a square shape. As a result, the sensitivity and accuracy of the object sensor arrangement 200 having a circular fluid passage 262 may be improved, compared to an object sensor arrangement 200 having a square fluid passage 262. However, it should be appreciated that the shape of the perimeters of the fluid passage 262 is an independent feature and the pressure sensor 100 and sensing method according to this invention can be used with any fluid passage 262 having any shape.

The inflow passage 264 of the fluid passage 262 is formed within and extends through the jet portion 260. The inflow passage 264 connects with the object passage 256 at an exit end 263 of the inflow passage 264. The pressure sensor 100 of the invention is positioned at the fluid outflow surface 266 opposing the inflow passage 264.

The fluid flow source 252 is positioned to generate a flow of fluid through the fluid passage 262. The flow of fluid may be created using any suitable arrangement which will provide a suitable fluid velocity. As shown in FIG. 3, the fluid flow source 252 generates a flow of air. Preferably, in this embodiment, the fluid flow source 252 is one or more air jets. The velocity of the fluid flow generated by the fluid flow source 252 will vary depending on the specific application. However, in this embodiment, the velocity of the air flow generated by the fluid flow source 252 must be compatible with the construction and dimensions of the specific pressure sensor 100 used. The dimensions of the fluid flow source 252 will also vary depending on the specific application.

In operation, when an object 150 is not present in the object passage 256, the fluid flow passing through the inflow passage 264 is unimpeded and impacts on the sensor membrane 112 of the pressure sensor 100 to deform the sensor membrane 112 from its rest position. As a result, the unimpeded fluid flow through the inflow passage 264 will impinge on the sensor membrane 112 at a first magnitude. Accordingly, the sensor membrane 112 will deform to contact a plurality of the electrodes 120 of the electrode set 122. When an object 150, such as a paper sheet, moves through the object passage 256, as shown in FIG. 3, the object 150 will come to a position at which it is positioned between the inflow passage 264 and the pressure sensor 100. As a result, the object 150 will obstruct or impede the fluid flow produced by the fluid flow source 252 and flowing through the inflow passage 264, diminishing the fluid flow impinging on the sensor membrane 112. As a result, the impeded fluid flow will impinge on the sensor membrane 112 at a second magnitude that is less than the first magnitude.

The diminished fluid flow results in a change in the amount of deformation in the sensor membrane 112 due to both the reduced force of the fluid flow and the resilience of the sensor membrane 112. As the deformation of the sensor membrane 112 changes, the degree of contact of the sensor membrane 112 with the electrodes 120 in the electrode set 122 will vary. As a result, for example, the specific annular electrodes 120 which are connected to or shorted to the center electrode 124 will vary. The specific annular electrodes 120 shorted to the center electrode 124 will vary depending on the presence/absence and/or the position of the object 150 in the object passage 256. Accordingly, the presence/absence and/or the position of the object 150 in the object passage 256 can be determined.

The sensor device 114 used in the object sensor arrangement 200 shown in FIG. 3 can effectively determine the position and/or the presence or absence of the object 150 passing through the object passage 256. The sensor device 114 in accordance with the invention does not only measure whether fluid is flowing out of the inflow passage 264 and impacting on the pressure sensor 100. Rather, the sensor device 114 in accordance with the invention also measures the change in fluid flow impacting upon the pressure sensor 100, such as by measuring the change in pressure exerted on the pressure sensor 100 due to the changed force exerted by the fluid flow.

Further, the pressure sensor 100 in accordance with the invention does not simply measure whether an object 150 is present in the object passage 256, based on the flow of fluid through the object passage 256. The sensor arrangement additionally measures the change in position of the object 150 in the object passage 256. For example, if all the annular electrodes 120 are shorted to the center electrode 124, it is determined that no object 150 is present in the object passage 256, as shown in FIG. 3. Alternatively, if there are no annular electrodes 120 shorted to the center electrode 124, it is determined that an object 150 is present in the object passage 256 and that such object 150 is completely obstructing the air flow in the sensing area 134 of the sensing space 132. Further, if some of the electrodes 120 adjacent to the center electrode 124 are shorted to the center electrode 124, but other ones of the electrodes 120 are not shorted to the center electrode 124, it is determined that either a leading or trailing edge is adjacent the sensing area 134 of the sensing space 132. If all the annular electrodes 120 were shorted to the center electrode 124 prior to such sensed condition, it is determined that the portion of the object 150 being sensed is the leading edge of the object 150. Alternatively, if none of the annular electrodes 120 were shorted to the center electrode 124 prior to such sensed position, it is determined that the portion of the object 150 being sensed is the trailing edge of the object 150.

As described above, the pressure sensor 100 as shown in FIGS. 1 and 2, may be used, for example, to detect a sheet of paper, as in the object sensor arrangement 200 shown in FIG. 3. As described above, an object disrupts the fluid flow from the fluid flow source 252, across the object passage 256, and onto the pressure sensor 100 and correspondingly changes the condition of contact of the sensor membrane 112 on the electrodes 120 of the electrode set 122. This arrangement may be used to infer the edge position of the object, such as an edge position of a sheet of paper or a silicon wafer. The portion of the paper sheet detected may be the leading edge, the trailing edge, or one or both sides edge of the paper sheet. It should be recognized that commercially available paper often has irregular edges. However, the adverse effect of irregular edges of paper sheets may be reduced by measuring the same edge of the paper sheet, or more precisely, the same point on the paper sheet.

Thus an object sensor arrangement 200 may comprise an array of the pressure sensors 100 according to this invention, to obtain multiple readings of an object's position and/or presence or absence, such as multiple readings of the object's edge locations at multiple times. Additionally, while the object may be preferably vertically centered between the exit end of the inflow passage 264 and the pressure sensor 100, such positioning is not necessary. The object sensor arrangement 200 may be effectively operated when the object 150 is positioned closer to the pressure sensor 100, or alternatively closer to the exit end of the inflow passage 264. However, if the distance between the fluid flow source 252 and both the sensed object 150 and the pressure sensor 100 is substantial, broadening out of the fluid flow generated by the fluid flow source 252 may occur. Such broadening out of the fluid flow would effect the resolution of the object sensor arrangement 200.

As described above, the presence, the absence, or the magnitude of pressure exerted on the sensor membrane 112 can be determined based on sensing the condition of the electrical contact between the electrodes 120 and the sensor membrane 112.

It should also be recognized that the pressure sensor 100 in accordance with the invention may also be used for time-dependent pressure sensing applications. When using the pressure sensor 100 in such time-dependent pressure sensing applications, the utility of the pressure sensor 100 may be increased by not only counting the number of shorted electrodes 120, but also measuring the time interval between shorting of consecutive ones of the electrodes 120. For example, when using the pressure sensor 100 of the invention in an object sensor arrangement 200, the rate of arrival and the rate of departure of an object 150 may be determined. As a result, not only the position, but also the speed of the object 150 may be determined.

Figure 4:
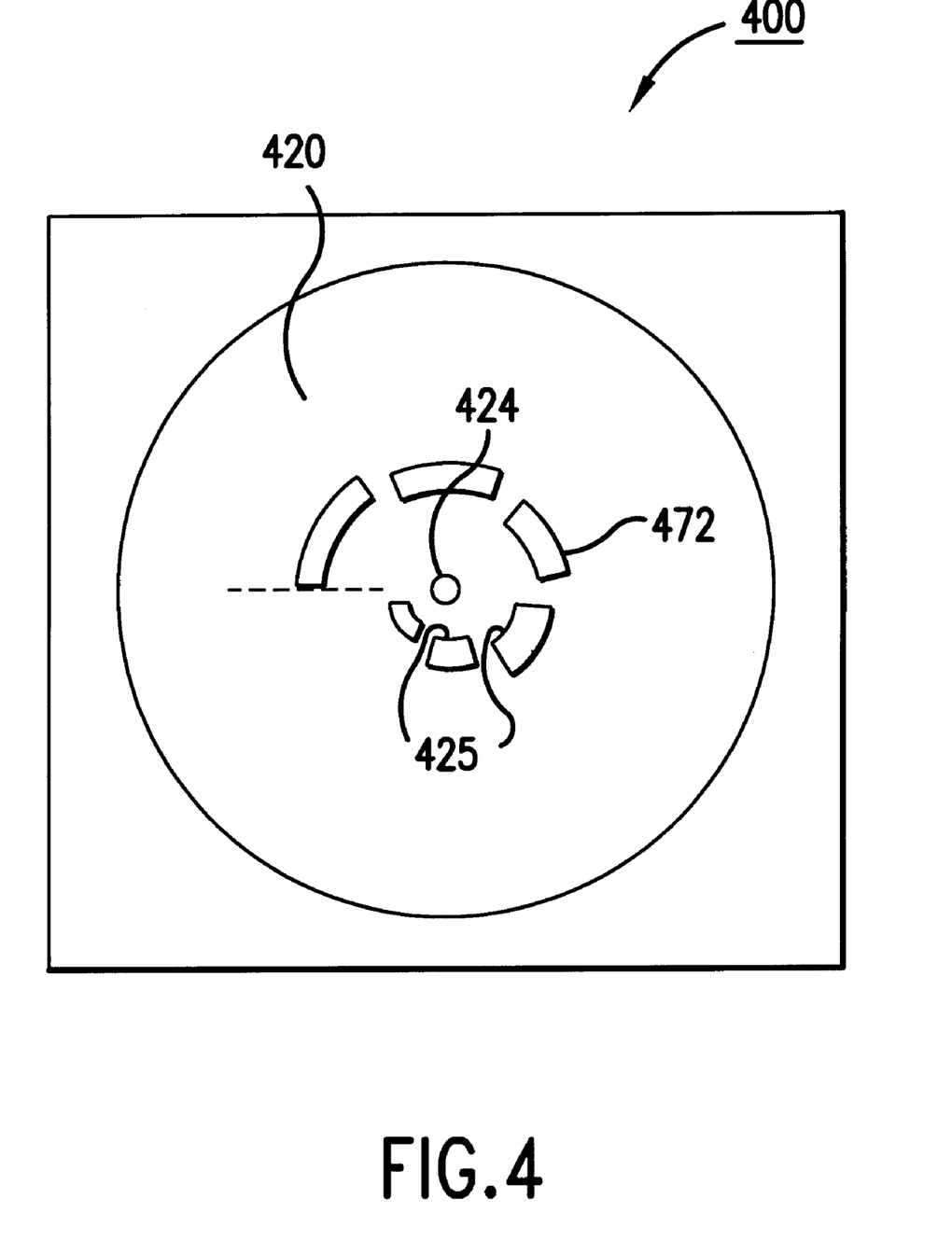
FIG. 4 is a top plan view showing a pressure sensor in accordance with a further embodiment of the invention.

FIG. 4 shows an enhanced resolution pressure sensor 400 in accordance with this invention. Similarly to the pressure sensor 100, the pressure sensor 400 shown in FIG. 4 comprises a plurality of electrodes 420 including a center electrode 424. However, in contrast to the pressure sensor 100 shown in FIGS. 1 and 2, the pressure sensor 400 shown in FIG. 4 uses segmented curved electrodes 472 defining segments, instead of full annular electrodes, as the outer annular electrodes. Specifically, as shown in FIG. 4, the outer electrodes comprise six curved electrodes 472 forming together a 360° arc about the center electrode 424. Each curved electrode 472 forms approximately a 60° arc.

Further, as shown in FIG. 4, each curved electrode 472 is spatially offset from an adjacent curved electrode 472 by ⅙ of the pressure range over which the pressure sensor 400 is capable of measuring. As a result of the electrode patterning as shown in FIG. 4, the resolution of the pressure sensor 400 is not limited by the width of the curved electrodes 472, but rather by the relative spacing of the inner edges 425 of the curved electrodes 472. As a result, the resolution of the pressure sensor 400 can be greater than the width of the curved electrodes 472. Accordingly, lower cost technology may be used to fabricate a sensitive pressure sensor 400 since the electrodes 420 do not have to be of such fine design.

As described above, in the embodiment of the invention shown in FIGS. 1 and 2, a predetermined threshold pressure ($P_o$) is required to activate the pressure sensor 100. That is, in the pressure sensor 100, a predetermined threshold pressure ($P_o$) is required to deform the sensor membrane 112 a sufficient amount such that the sensor membrane 112 contacts, for example, the center electrode 124. As a result, a "dead" zone occurs in the pressure sensor 100 shown in FIGS. 1 and 2, when the pressure applied (P) to the pressure sensor 100 is less than the predetermined threshold pressure ($P_o$), i.e., when $P<P_o$.

Figure 5:
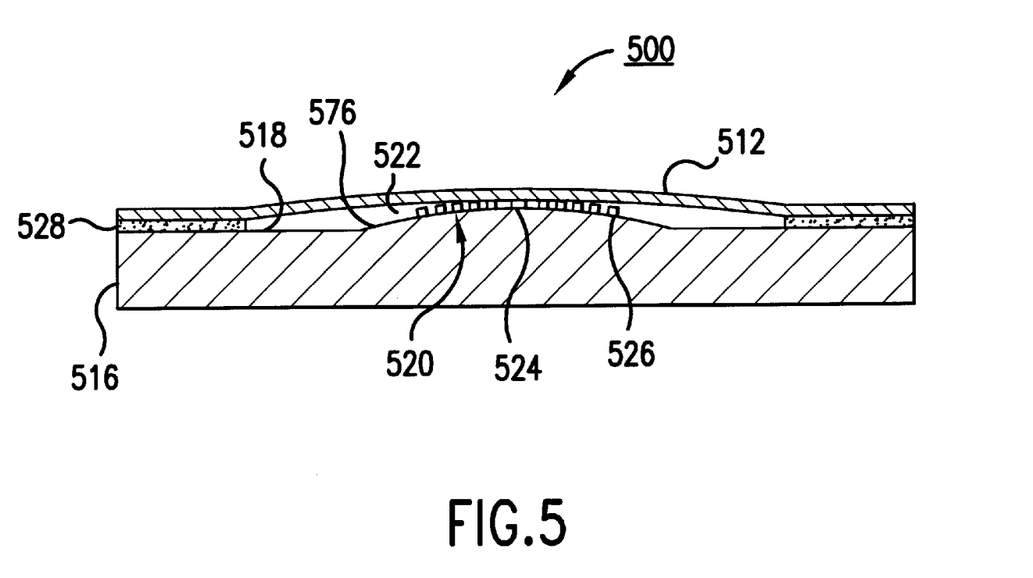
FIG. 5 is a side cross-sectional view of a pressure sensor in accordance with yet another embodiment of the invention.

In some applications, such a dead zone cannot be tolerated. Various modifications of the pressure sensor 100 shown in FIGS. 1 and 2 are within the purview of the invention in applications of the invention in which the dead zone cannot be tolerated. For example, one modification is to construct the pressure sensor 100 using a vacuum lamination process. Specifically, the sensor membrane 112 may be vacuum laminated on the spacer layer 128 so that the threshold pressure is slightly below atmospheric pressure. As a result, the center portion of the sensor membrane 112 always extends into the sensing space 132 and is in contact with the center electrode 124. Thus, the dead zone is eliminated using such vacuum lamination. In essence, the rest position of the sensor membrane 112 is modified by using such vacuum lamination so that the center electrode 120 contacts the sensor membrane 112. FIG. 5 shows a further embodiment of a pressure sensor according to this invention.

The pressure sensor 500 shown in FIG. 5 also eliminates the dead zone. The pressure sensor 500 eliminates the dead zone using a different technique. Similarly to the pressure sensor 100 shown in FIGS. 1 and 2, the pressure sensor 500 shown in FIG. 5 includes a flexible sensor membrane 512, an electrode substrate 516 having an electrode surface 518 and an electrode set 522 including a plurality of electrodes 520. The electrodes 520 include a center electrode 524 and a number of annular electrodes 526 disposed around the center electrode 524.

However, as shown in FIG. 5, electrode surface 518 includes a domed portion 576 positioned in the center of the electrode surface 518. The combined height of the domed portion 576 and the center electrode 524 is slightly greater than the thickness of the spacer layer 528. As a result, the center electrode 524 will always be in electrical contact with the sensor membrane 512 since the center electrode 524 raises the sensor membrane 512 above its normal rest position.

Figure 6:
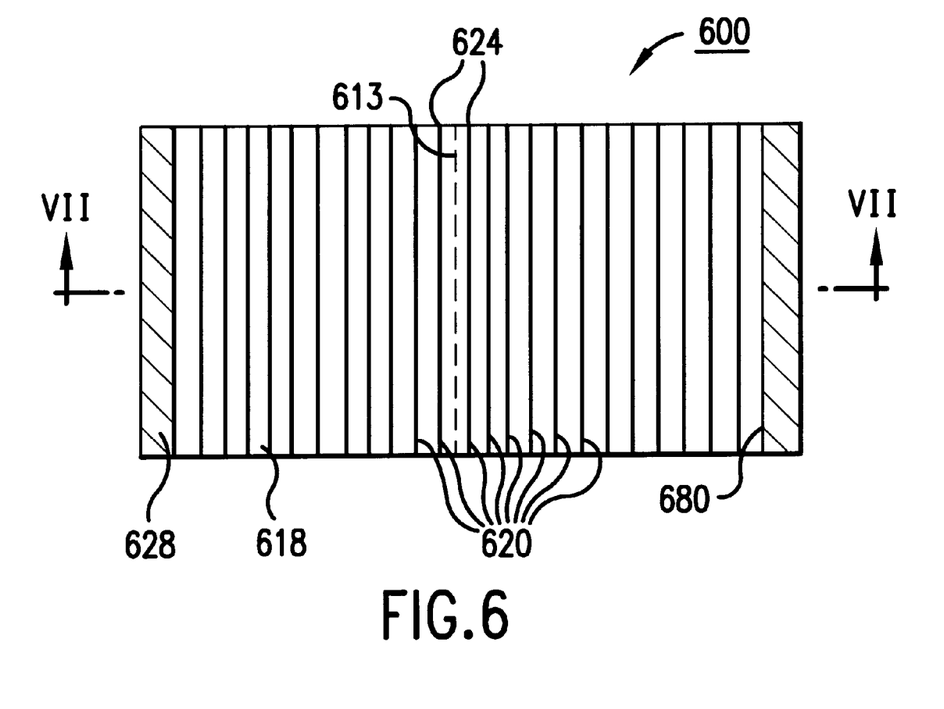
FIG. 6 is a top plan view of a pressure sensor in accordance with yet another embodiment of the invention.
Figure 7:
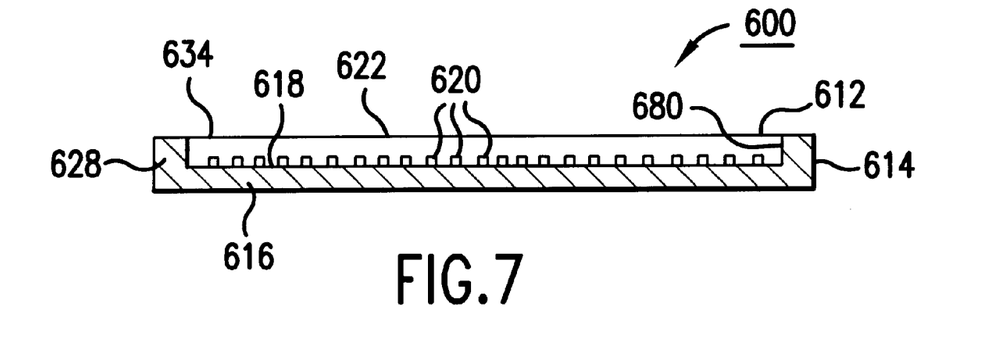
FIG. 7 is a side cross-sectional view of the pressure sensor of FIG. 6 along the line VII—VII in accordance with the invention.

FIGS. 6 and 7 show a further embodiment of the pressure sensor in accordance with the invention. Similarly to the embodiment shown in FIGS. 1 and 2, the pressure sensor 600 shown in FIGS. 6 and 7 includes a conductive sensor membrane 612 spaced from a sensor device 614 by a spacer layer 628. The sensor device 614 includes an electrode substrate 616 having an electrode surface 618 and an electrode set 622 including a plurality of electrodes 620. The pressure sensor 600 also includes a sensing area 634. Each of the electrodes 620 is connected to the signal processor 270, as shown in FIG. 2. As shown in FIG. 7, the electrode substrate 616 and the spacer layer 628 may be integrally formed.

However, in contrast to the pressure sensor 100 of FIGS. 1 and 2, each of the plurality of electrodes 620 in the pressure sensor 600 are linearly arranged parallel to each other. As pressure is applied to the sensor membrane 612 to deform the sensor membrane 612 toward the linear electrodes 620, the sensor membrane 612 will make both mechanical and electrical contact with selected ones of the electrodes 620. The specific ones of the electrodes 620 contacted by the sensor membrane 612 will depend on the particular point at which the pressure is applied to the sensor membrane 612.

If pressure is applied over the entire sensing area 634, the sensor membrane 612 will contact all of the linear electrodes 620. Since the sensor membrane 612 is electrically conductive, the sensor membrane 612 will electrically connect all of the linear electrodes 620 to the sensor membrane or each linear electrode to its neighbor electrode. Since the electrodes 620 are connected to a signal processor, such as a programmable logic array, microcontroller or analog circuit, when all of the electrodes 620 are contacted by the sensor membrane 612 this condition may be sensed by the signal processor. The signal processor may then output an appropriate output signal indicative of this condition.

For example, the signal processor may utilize a scanning process. Specifically, one electrode may be energized, and the other electrodes sensed to determine whether they are connected to the one electrode. Thereafter a different electrode is energized and all the other electrodes are sensed to determine if they are connected to the different electrode. A well known scanning algorithm may be utilized to perform such a scanning process. Alternatively, the process could be simplified to select only one electrode or a limited number of electrodes to be energized.

It should be appreciated that the signal processor can be implemented on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, an analog circuit or the like.

As discussed above with other embodiments of the invention, the sensor membrane 612 will be in an undeformed rest position when no pressure is applied to the sensor membrane 612. The sensor membrane 612 is shown in such a rest position in FIG. 7. Due to the resilient nature of the sensor membrane 612 and the manner in which the sensor membrane 612 is supported by the spacer layer 628, as pressure is gradually applied to the sensor membrane 612, the first electrodes to be contacted will be the center electrode or electrodes 624, depending on whether the electrodes 620 bracket or lie on the mid line 613 of the sensor membrane 612. As pressure increases, the electrodes 620 positioned closer to each spacer layer 628, as shown in FIG. 7, will be contacted by the sensor membrane 612, until all of the electrodes 620 are contacted by the sensor membrane 612. The threshold pressure required for the sensor membrane 612 to contact the center electrodes 624, as opposed to the pressure at which all the electrodes 620 are contacted, defines the dynamic pressure range over which the pressure sensor 600 senses pressure.

Figure 8:
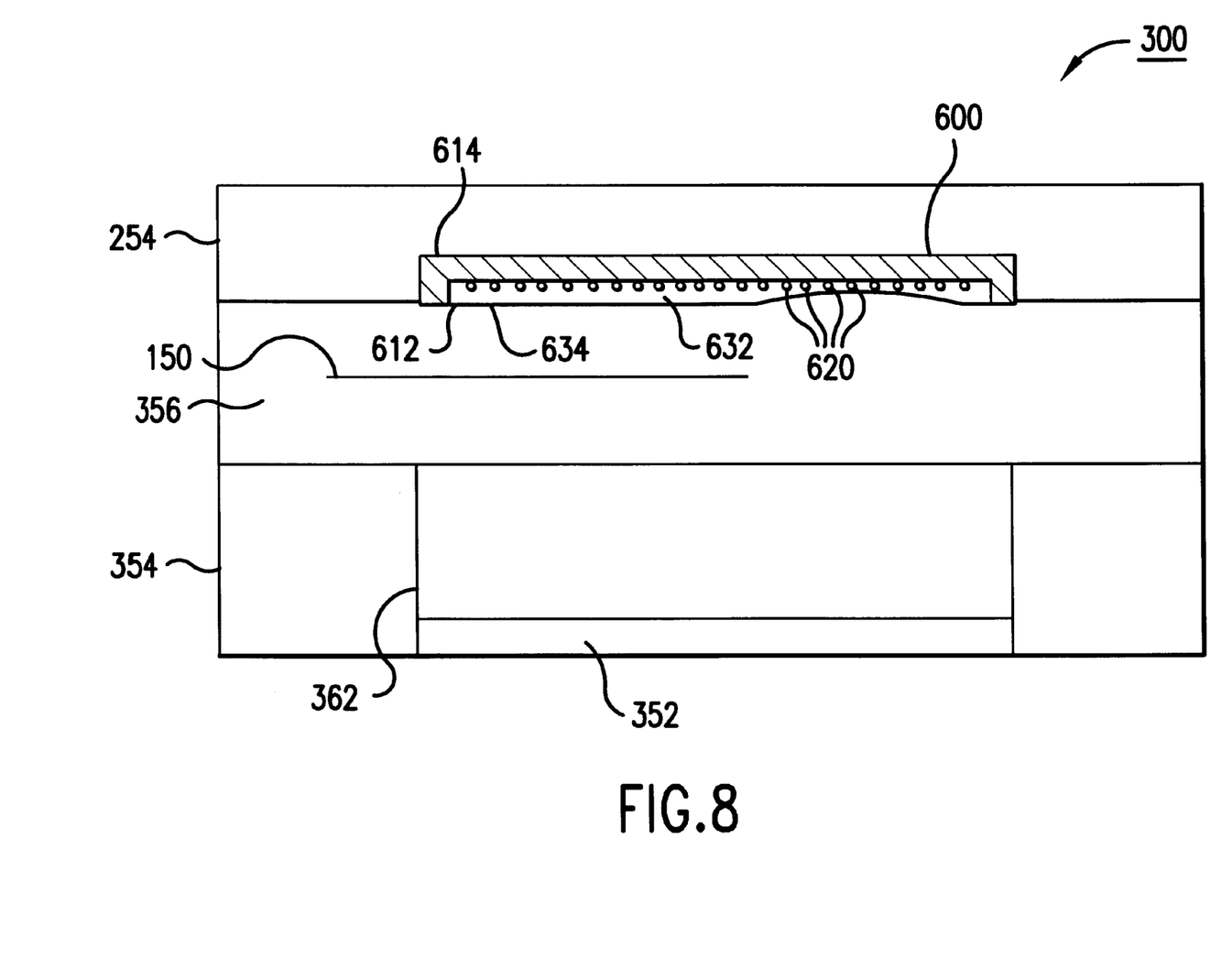
FIG. 8 is a side cross-sectional view of the pressure sensor shown in FIGS. 6 and 7 used as an object sensor in accordance with an embodiment of the invention.

FIG. 8 shows the pressure sensor 600 of FIGS. 6 and 7 used in an object sensor arrangement 300 in accordance with this invention. For example, the object sensor arrangement 300 shown in FIG. 8 could be positioned in a photocopy device to monitor the passage of paper sheet. However, as discussed above, the object sensor arrangement 300 shown in FIG. 8 could be used in a wide variety of devices other than a photocopy device. The object sensor arrangement 300 shown in FIG. 8 is similar to the object sensor arrangement 200 shown in FIG. 3. The object sensor arrangement 300 includes a sensor housing 354 having an object passage 356 and a fluid passage 362. The pressure sensor 600 in accordance with this invention is positioned opposite the fluid passage 662. The pressure sensor 600 includes the sensor membrane 612 and the sensor device 614. The sensing area 634 is defined on the sensor membrane 612 adjacent to the sensing space 632. The length of the sensing area 634 may be, for example, equivalent to the length of a paper sheet in one embodiment of the invention.

A fluid flow source 352 generates a flow of fluid, which travels across the object passage 356 and impacts upon the sensing area 634 of the sensor membrane 612. Using a photocopy device as an example, if no paper sheet is present in the object passage 356, the fluid flow is unobstructed and will impinge upon the sensor membrane 612 to deform the sensor membrane 612 over the entire sensing area 634. The fluid flow is generated to be sufficient to deform the sensor membrane 612 to contact all of the linear electrodes 620. However, as the paper sheet arrives and departs from the sensing area 634, the fluid flow will be obstructed. This will result in the sensor membrane 612 returning towards the rest position in certain portions of the sensing area 634. As a result, the sensing membrane will move away and lose contact with certain electrodes 620.

Illustratively, FIG. 8 shows a paper sheet 150 departing from the sensing area 634. As a result, the electrodes 620 positioned on the right, as shown in FIG. 8, will be in electrical and mechanical contact with the sensing membrane 612, while the electrodes 620 on the left will not be in contact with the sensor membrane 612 due to the absence of the pressure applied by the fluid flow from the fluid flow source 352. As a result, the object sensor arrangement 300 including the pressure sensor 600 of this invention may provide an indication of the arrival, the departure, and the position of a paper sheet.

The specific materials and dimensions of the pressure sensor in accordance with this invention will vary depending on the specific application of the pressure sensor. Further, the design of the pressure sensor including the minimum sizes of the sensor membrane and the sensor device, as well as the plurality of electrodes, will depend on the specifics of the fabrication technology utilized. Such factors include film thickness, mechanical film properties and patterning resolution. For example, providing a sensing space having a diameter on the order of 1 mm is possible using very low-cost technology as described in detail below. Further, a sensing space smaller than the 1 mm size can be achieved using more refined fabrication methods.

As described above, pressure resolution, i.e., sensitivity of the pressure sensor 100 as shown in FIGS. 1 and 2, for example, depends on the pattern of the electrodes 120. In accordance with this invention and the embodiments described above, pressure sensitivity of the pressure sensor 100 in the dynamic range or range of operation are also determined by the sensor membrane 112 dimensions, the thickness of the sensing space 132, which itself is determined by the thickness of the spacer layer 128, the elasticity or resilience of the sensor membrane 112, as well as the pattern of the electrodes 120, including the spacing of the electrodes 120 in the electrode set 122. Both the dimensions and number of the electrodes may be widely varied in accordance with the invention, making the invention suitable to a multitude of different applications. For example, the number of electrodes may be increased as compared with the number of electrodes 120 shown in FIGS. 1 and 2. This would result in enhanced resolution of the pressure sensor 100. Further, the width of the annular electrodes 120 as shown in FIGS. 1 and 2 may decreased, thereby allowing more electrodes to be positioned within a given distance. Accordingly, the sensitivity of the pressure sensor 100 would be enhanced. Further, the number or position of electrodes can be spatially varied to compensate for non-linearities of the membrane response.

A wide variety of materials may be used to construct the pressure sensor of the invention. For example, PCB or flexcircuit material may be used to construct the electrode substrate. The spacer layer may be formed by double-sided self-adhesive polymer foil or a patterned insulative or conductive layer. The sensor membrane may be formed by a metallized polymer foil, for example, Kapton or Mylar.

In the pressure sensor of the invention, it is preferable to assure the stability of the electrical contacts between the sensor membrane and the electrodes. To assure the stability of the electrical contacts, a non-oxidizing metal is preferably used for the electrodes and for the sensor membrane, such as, for example, the conductive film of the sensor membrane. Such non-oxidizing metals preferably used in the invention include silver, gold, or nickel. Other non-noble metals may be utilized if laminated under nitrogen.

In accordance with this invention, the pressure sensors can be arranged in a wide variety of arrangements. For example, the pressure sensors can be arranged in large area arrays. Such large area arrays, including interconnect arrays, can be readily fabricated using photolithography or screen printing processes for forming the electrode and interconnect patterns. Further, stamping or photolithography processes may be used to form multiple sensing spaces defined by the spacer layer. The pressure sensor may be assembled by lamination of the electrode substrate, the spacer layer and the sensor membrane. For example, stamped double sided self-adhesive foil may utilized for the spacer layer and would constitute one very low cost approach.

Additionally, a plurality of pressure sensors in accordance with the invention can be arranged in one-dimensional or two-dimensional arrays to form pressure sensing sites. Multiplexing or matrix addressing may be used to reduce the number of interconnect lines between these multiple pressure sensing sites. If necessary, for example, in large two-dimensional arrays or very large one-dimensional arrays, the number connections to each individual site can be further reduced by locally converting the electrode count (1 lead per electrode) to a bitword (n leads per $2^n$ electrodes). Such an arrangement can be achieved with a standard decoder chip at each node on the back side of the electrode substrate or with low resolution sensors, i.e. with a limited number of electrodes. Further, all individual annular electrodes of an electrode set can be contacted by using single-sided substrates by having segments instead of fully closed rings.

For high resolution sensors including a large number of annular electrodes or ring electrodes, a workable interconnect method is to use a double-sided, through metallized substrate material. Such a metallized substrate material may include a standard PCB material or even flexcircuit material. In such an arrangement, all the sensing electrodes are positioned on one side of the electrode substrate and all interconnect and/or local signal conversion/processing apparatus is positioned on the other side. A multitude of possibilities exist for interconnection and local circuitry if a double-sided through-metallized substrate material is used for the electrode substrate. In particular, any known or later developed substrate materials, interconnect materials, and/or interconnect techniques and methods can be used to form a large array of the thin film pressure sensors according to this invention. Similarly, any known or later developed method can be used to form the various individual features of the thin film pressure sensor described above, such as the electrodes, spacer layer, and sensor membrane.

While this invention has been described in conjunction with specific embodiments outlined above, it is evident that many alternative, modifications and variations may be apparent to those skilled in the art. Accordingly, the preferred embodiments of the invention as set forth herein are intended to be illustrative, not limiting. Various changes may be made without departing from the spirit and scope of the invention.

What is claimed is:

1. A pressure sensing apparatus that senses at least a presence, an absence, magnitude or location of pressure, comprising:

a substrate;

a plurality of electrodes formed over the substrate; and a conductive sensor membrane extending over and spaced from at least one of the plurality of electrodes;

wherein, when pressure is applied to the sensor membrane, the sensor membrane is deformed to electrically contact at least one of the plurality of electrodes from which it is spaced.

2. The pressure sensing apparatus according to claim 1, further comprises a sensing space between the sensor membrane and the surface of the electrodes, wherein the sensor membrane is deformable by a pressure exerted on the sensor membrane into the sensing space toward the plurality of electrodes.

3. The pressure sensing apparatus according to claim 2, further comprising a spacer layer formed over the substrate and under the sensor membrane, the space layer spacing the sensor membrane from the substrate.

4. The pressure sensing apparatus according to claim 2, wherein the electrode surface is substantially parallel to the sensor membrane.

5. The pressure sensing apparatus according to claim 2, wherein:

the electrode surface includes a domed portion; and at least some of the plurality of electrodes are positioned on the domed portion.

6. The pressure sensing apparatus according to claim 1, wherein the plurality of electrodes includes a center electrode and at least one outer electrode surrounding the center electrode.

7. The pressure sensing apparatus according to claim 6, wherein at least one outer electrode is an annular electrode disposed around the center electrode.

8. The pressure sensing apparatus according to claim 6, wherein the at least one outer electrode includes a plurality of electrode segments, each segment extending over a predetermined portion of a circle.

9. The pressure sensing apparatus of claim 8, wherein the plurality of electrode segments includes six electrodes, each extending along an approximately 60° arc about the center electrode, each of the six electrodes disposed at a different distance from the center electrode.

10. The pressure sensing apparatus of claim 8, wherein each of the plurality of electrode segments extend along an arc about the center electrode, each of the electrodes disposed at a different distance from the center electrode.

11. The pressure sensing apparatus according to claim 1, wherein the plurality of electrodes includes at least a first electrode and a second electrode, the first electrode positioned parallel to the second electrode.

12. The pressure sensing apparatus according to claim 11, wherein the first electrode and the second electrode are straight.

13. The pressure sensing apparatus according to claim 1, wherein the sensor membrane includes a flexible film and a conductive film.

14. A photocopy device including the pressure sensing apparatus of claim 1.

15. A printer device including the pressure sensing apparatus of claim 1.

16. A facsimile machine including the pressure sensing apparatus of claim 1.

17. A document handler including the pressure sensing apparatus of claim 1.

18. A paper making machine including the pressure sensing apparatus of claim 1.

19. A wafer handling system including the pressure sensing apparatus of claim 1.

20. A sheet metal rolling machine including the pressure sensing apparatus of claim 1.

21. A conveyor system including the pressure sensing apparatus of claim 1.

22. A materials transport system including the pressure sensing apparatus of claim 1.

23. An image forming device, comprising:
   an image forming engine;
   a recording medium transport system that supplies a recording medium to and removes the recording medium from the image forming engine; and
   at least one pressure sensing apparatus according to claim 1.

24. The image forming device of claim 23, further comprising at least one object sensor that detects at least one of a position, a presence or an absence of the recording medium in the paper transport system, the object sensor including:
   a housing defining an object passage through which the recording medium is movable;
   a fluid source that provides a fluid flow across the object passage;
   the pressure sensing apparatus generating a signal indicative of an amount of the fluid flow; and
   wherein, when the recording medium is in an obstructing position relative to the fluid source and the pressure sensing apparatus, the sensed fluid flow decreases.

25. The image forming device of claim 24, wherein the image forming device is at least one of a photocopier, a printer, a facsimile machine, or a scanner.

26. The apparatus according to claim 24, wherein the sensor membrane contacts at least two of the plurality of electrodes when the recording medium is not in the obstructing position.

27. The apparatus according to claim 26, wherein the sensor membrane contacts each of the at least two electrodes when the recording medium is not in the obstructing position, and the sensor membrane is resiliently deformable toward a rest position when the sensed fluid flow decreases as a result of the object moving into the obstructing position.

* * * * *